UNITED STATES PATENT OFFICE.

PAUL THOMASCHEWSKI, OF VOHWINKEL, NEAR ELBERFELD, GERMANY, ASSIGNOR TO FARBENFABRIKEN VORM. FRIEDR. BAYER & CO., OF ELBERFELD, GERMANY, A CORPORATION OF GERMANY.

VAT DYE.

No. 928,891.     Specification of Letters Patent.     Patented July 20, 1909.

Application filed March 16, 1909. Serial No. 483,675.

*To all whom it may concern:*

Be it known that I, PAUL THOMASCHEWSKI, doctor of philosophy, chemist, citizen of the German Empire, residing at Vohwinkel, near Elberfeld, Germany, have invented new and useful Improvements in New Vat Dyes, of which the following is a specification.

My invention relates to the manufacture and production of a dyestuff of the anthracene series being a pyrimidone of the following formula:

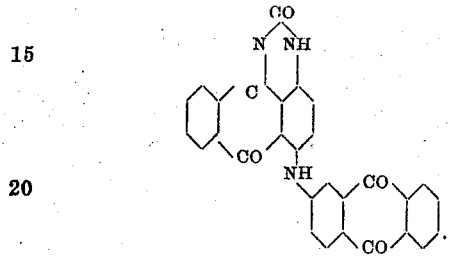

It can be obtained by condensing with the urea the 1-amino-4-beta-anthriminoanthraquinone (obtainable from 1-nitro-4-amino-anthraquinone and beta-chloro-anthraquinone and reduction of the condensation product).

In carrying out the process practically I can proceed as follows, the parts being by weight: A mixture of 6 parts of 1-amino-4-beta-anthriminoanthraquinone, 10 parts of urea and 150 parts of phenol is heated to boiling for 5 hours. Alcohol is added to the cold melt and the crystalline precipitate is filtered off.

My new coloring matter thus obtained is a dark red crystalline powder soluble with difficulty in the usual organic solvents with a violet color; and soluble in concentrated sulfuric acid with a violet-blue color. Upon treatment with hydrosulfite and caustic soda lye an orange vat is obtained which dyes cotton violet-red fast shades.

I claim:

The herein-described new dyestuff being a pyrimidone of the anthracene series obtainable by condensing 1-amino-4-beta-anthriminoanthraquinone with urea, which dyestuff is a dark red crystalline powder soluble with difficulty in the usual organic solvents and soluble in concentrated sulfuric acid with a violet-blue color; a vat being obtained from the new dye by treating it with hydrosulfite and caustic alkali, which vat dyes cotton violet-red fast shades, substantially as hereinbefore described.

In testimony whereof I have hereunto set my hand in the presence of two subscribing witnesses.

PAUL THOMASCHEWSKI. [L. S.]

Witnesses:
   OTTO KÖNIG,
   AUG DICKBEN.

It is hereby certified that in Letters Patent No. 928,891, granted July 20, 1909, upon the application of Paul Thomaschewski, of Vohwinkel, near Elberfeld, Germany, for an improvement in "Vat Dyes," errors appear in the printed specification requiring correction, as follows: In lines 12-23 the formula:

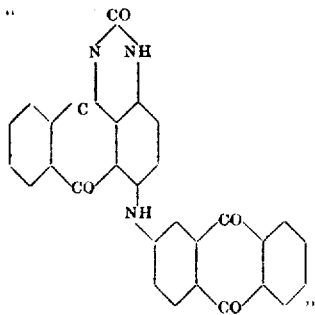 should read 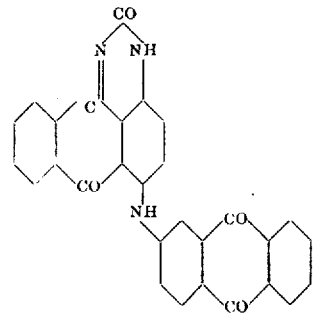

and in line 23 the article "the" should be stricken out; and that the said Letters Patent should be read with these corrections therein that the same may conform to the record of the case in the Patent Office.

Signed and sealed this 28th day of September, A. D., 1909.

[SEAL.]

C. C. BILLINGS,
*Acting Commissioner of Patents.*